(12) United States Patent
Krössmann et al.

(10) Patent No.: US 7,350,637 B2
(45) Date of Patent: Apr. 1, 2008

(54) APPARATUS AND METHOD FOR THE TRANSPORT OF ARTICLES FORMING A MASS FLOW AS WELL AS APPARATUS FOR FILLING A SUBSEQUENT APPARATUS WITH ROD-SHAPED ARTICLES

(75) Inventors: Jürgen Krössmann, Schwarzenbek (DE); Alexander Maurer, Hamburg (DE)

(73) Assignee: Hauni Maschinenbau AG, Hamburg (DE)

( * ) Notice: Subject to any disclaimer, the term of this patent is extended or adjusted under 35 U.S.C. 154(b) by 0 days.

(21) Appl. No.: 11/486,251

(22) Filed: Jul. 14, 2006

(65) Prior Publication Data

US 2007/0012544 A1    Jan. 18, 2007

(30) Foreign Application Priority Data

Jul. 15, 2005  (DE) .................. 10 2005 033 907

(51) Int. Cl.
*B65G 1/00* (2006.01)
(52) U.S. Cl. .................................. 198/347.2
(58) Field of Classification Search ............ 198/347.1, 198/347.2, 347.3
See application file for complete search history.

(56) References Cited

U.S. PATENT DOCUMENTS

| 4,507,040 A | * | 3/1985 | Baese et al. ............. 198/347.2 |
| 5,529,164 A | * | 6/1996 | Meinke et al. ........... 198/347.2 |
| 6,193,050 B1 | * | 2/2001 | Svejkovsky et al. ..... 198/347.2 |
| 6,866,135 B2 |   | 3/2005 | Quadracci et al. |
| 7,028,828 B2 | * | 4/2006 | Dombek et al. ......... 198/347.2 |

FOREIGN PATENT DOCUMENTS

| DE | 31 21 353 A1 | 4/1982 |
| DE | 32 23 070 A1 | 1/1983 |
| DE | 35 46 654 C2 | 10/1985 |
| EP | 0 057 806 | 8/1982 |
| GB | 2 025 882 A | 1/1980 |
| GB | 2 077 214 A1 | 12/1981 |

OTHER PUBLICATIONS

German Office Action dated Feb. 24, 2006 in German Application No. 10 2005 033.907.7.
European Search Report dated Nov. 17, 2006, in Europe an Application No. EP 06 07 6422 Appendix to the European Search Report.

* cited by examiner

*Primary Examiner*—James R. Bidwell
(74) *Attorney, Agent, or Firm*—Venable LLP; Robert Kinberg; Steven J. Schwarz

(57) ABSTRACT

Apparatus for transporting articles forming a mass flow from an input device to an output device, including an endless conveying element with a transport run and a return run, the conveying element being guided about at least three rollers designed as a driving and/or deflecting element, wherein the transport run can be moved out of a throughflow position in which the transport run exhibits its maximum length, into a discharge position in which the transport run is shortened from the maximum length, and vice versa, further wherein at least one of the deflecting and/or driving rollers is movable relative to the other deflecting and/or driving rollers for altering the length of the transport run.

20 Claims, 6 Drawing Sheets

APPARATUS AND METHOD FOR THE TRANSPORT OF ARTICLES FORMING A MASS FLOW AS WELL AS APPARATUS FOR FILLING A SUBSEQUENT APPARATUS WITH ROD-SHAPED ARTICLES

CROSS-REFERENCE TO RELATED APPLICATION

This application claims the priority of German Patent Application No. 10 2005 033 907.7, filed on Jul. 15, 2005, the subject matter of which is incorporated herein by reference.

BACKGROUND OF THE INVENTION

The invention concerns an apparatus for transporting articles forming a mass flow from an input device to an output device, including an endless conveying element with a transport run and a return run, the conveying element being guided about at least two rollers designed as a driving and/or deflecting element.

Furthermore, the invention concerns an apparatus for filling a subsequent apparatus with rod-shaped articles, in particular a packer, including a filling head with a feed element for transporting articles forming a mass flow, the feed element leading into a chute in the region of an orifice and comprising a lower conveying means which includes two transport elements arranged one behind the other.

Furthermore, the invention is concerned with a method for transporting articles forming a mass flow, including the steps of: feeding the mass flow in the main direction of conveying into an apparatus for filling a subsequent apparatus, in particular according to any of claims 16 to 18, transporting the mass flow from an inlet region to an outlet region, and carrying the mass flow away.

Apparatuses of this kind for filling a subsequent apparatus are used in particular in the tobacco-processing industry. These apparatuses are used e.g. to supply a packer with rod-shaped articles, e.g. cigarettes, tobacco rods, filter rods or the like. By means of the feed device, a usually multi-layered mass flow having a given height is transported into the filling head. By means of the feed device, the articles or the mass flow composed of them are guided into the region of the orifice. Via a chute which adjoins the feed device, the articles are fed to the packer. An essential component of above apparatuses of this kind is an apparatus for transporting articles forming a mass flow from an input device, for example, an input conveyor, to an output device, for example, a chute which is associated with a packer. Such apparatuses for transporting the articles include an endless conveying element which is guided about two rollers which are designed as driving and/or deflecting rollers. The portion of the conveying element which carries/receives the articles or the mass flow is the transport run. The portion of the conveying element which runs empty is called the return run.

During normal operation of such apparatuses it is necessary to be able to carry out e.g. a change of product or brand. This means that the apparatus must be completely emptied of one product or brand before the next product or brand can be introduced into the apparatus. In other cases it may be necessary to discharge from the apparatus substandard, defective or otherwise unwanted articles or sections of the mass flow which have been detected before in any known manner.

With the known apparatuses and methods it is necessary to uncouple the apparatuses from the next devices and/or to shut down the apparatuses, in order to remove the articles, as a rule at least partly manually, from the apparatus. For this purpose, at the end of the apparatus for example a guide element made of cardboard, sheet metal or the like is positioned in the region of the orifice, which conveys the articles into a receptacle before they can drop into the chute. This is firstly time-consuming. Secondly there is only the option of emptying the apparatus completely or not at all. In other words it is not possible, for example, in a mass flow, to discharge the middle section which is e.g. detected as substandard. In order to discharge the substandard articles from the middle of the mass flow, the whole contents of the apparatus must be discharged, i.e. also articles which have not been detected as substandard. This leads to high wastage of articles.

SUMMARY OF THE INVENTION

It is therefore an object of the present invention to provide an apparatus with which both selective discharge of detected articles and complete discharge for emptying the apparatus are ensured. It is further the object of the present invention to propose a corresponding method.

This object is achieved firstly by an apparatus for transporting articles forming a mass flow of the kind mentioned hereinbefore, by the fact that the transport run can be moved out of a throughflow position in which the transport run exhibits its maximum length, into a discharge position in which the transport run is shortened from the maximum length, and vice versa. With this construction it is possible to create an ejection chute within the apparatus which, in addition to complete emptying of the apparatus, also allows selective discharge of individual articles or of sections of the mass flow. Shortening the actual transport section results in an opening in the plane of transport of the conveying element, through which the articles can be split off from the actual mass flow to a desired or defined extent and carried away selectively.

Preferably a third roller is provided, at least one of the deflecting and/or driving rollers being movable relative to the other deflecting and/or driving rollers for altering the length of the transport run. As a result, a structurally simple solution for automatically ensuring the ejection of articles from a mass flow is offered.

In a preferred development of the invention, the roller arranged on the inlet side in the main direction of conveying is designed as a movable deflecting roller, whereby on the one hand it is ensured that all articles can pass through the opening to be formed and so be discharged if necessary. On the other hand, particularly easy discharge of articles from the middle of the mass flow is thus also ensured.

Advantageously, in the region of the transport run is arranged a separating or blocking element which is movable out of a release position in which the mass flow can be transported unhindered on the transport run in the main direction of conveying, into a blocking position in which the mass flow is prevented from free transport in the main direction of conveying, and vice versa. Due to this development according to the invention, articles detected for discharge can be effectively prevented from mixing with articles which have already passed through the opening, during discharge.

Further, the object is achieved by an apparatus for filling a subsequent apparatus with rod-shaped articles with the characteristics mentioned hereinbefore, by the fact that the rear transport element of the lower conveying means, in the main direction of conveying, is designed as an apparatus according to any of claims 1 to 15. The resulting advantages have already been mentioned above and relate to this apparatus as well.

Further, the object is also achieved by a method with the steps mentioned hereinbefore by the fact that the mass flow is optionally carried away completely in the outlet region or discharged at least partially before reaching the outlet region. The advantages gained as a result have been described above.

Preferably, the transport section for discharge of parts of the mass flow or the whole mass flow is opened between the inlet region and the outlet region. With this step, variable and space-saving discharge of parts of the mass flow or the whole mass flow at any positions within the apparatus is carried out.

BRIEF DESCRIPTION OF THE DRAWINGS

Further advantageous or preferred characteristics and steps are apparent from the description. A particularly preferred embodiment as well as the principle of the method are illustrated in more detail with the aid of the attached drawings. The drawings show.

DETAILED DESCRIPTION OF THE INVENTION

The apparatuses shown and the method described serve to discharge cigarettes or filter rods from a mass flow. Naturally the apparatuses can also be used in a different arrangement and/or as a separate component for discharging further articles in the tobacco-processing industry, and also in other fields.

For a better understanding of the invention, first the basic structure as well as the basic function will be described with reference to FIGS. 4 to 6. The detailed description is then given with reference to FIGS. 1 to 3.

Figure 4:
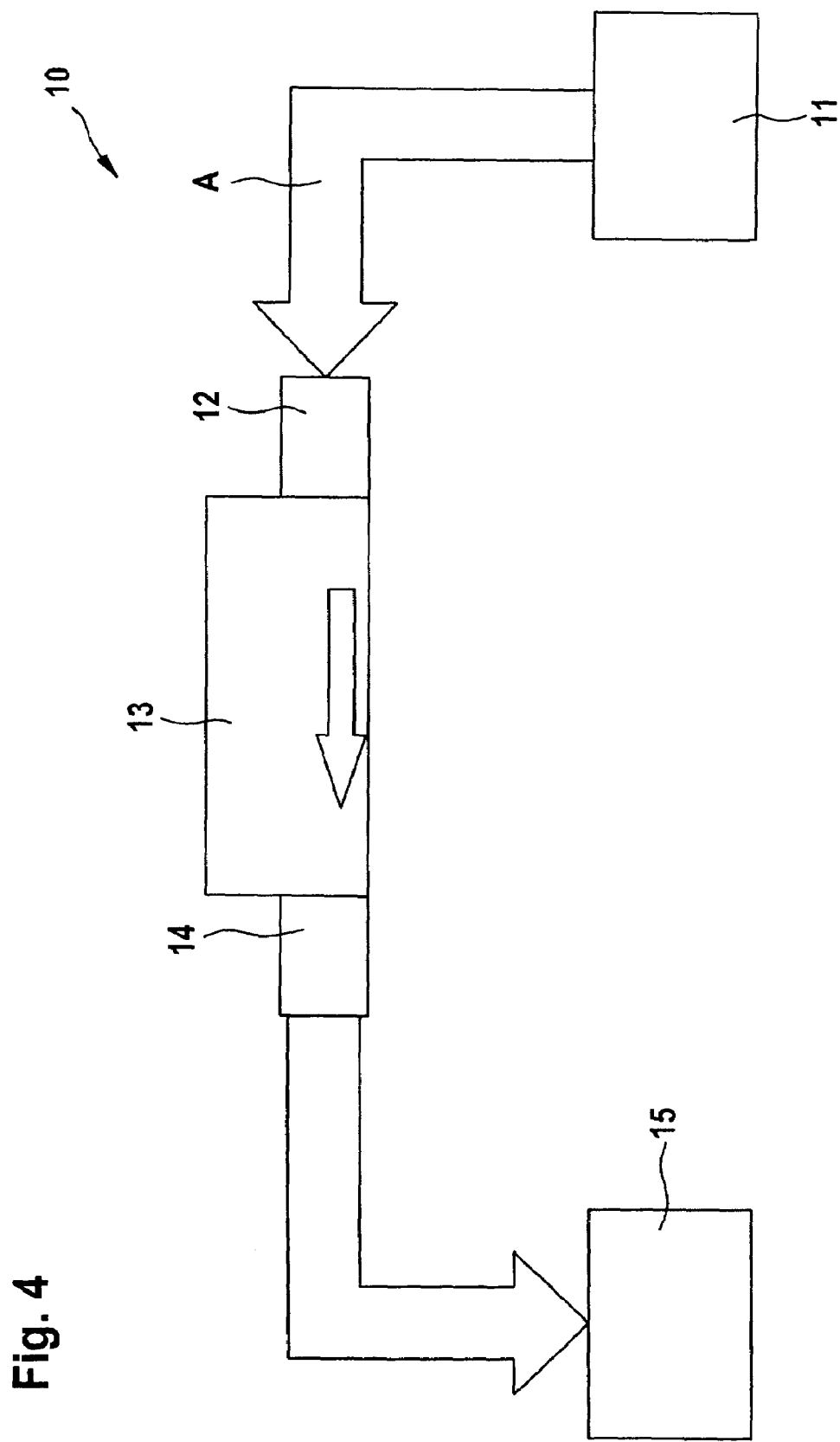
Figure 5:
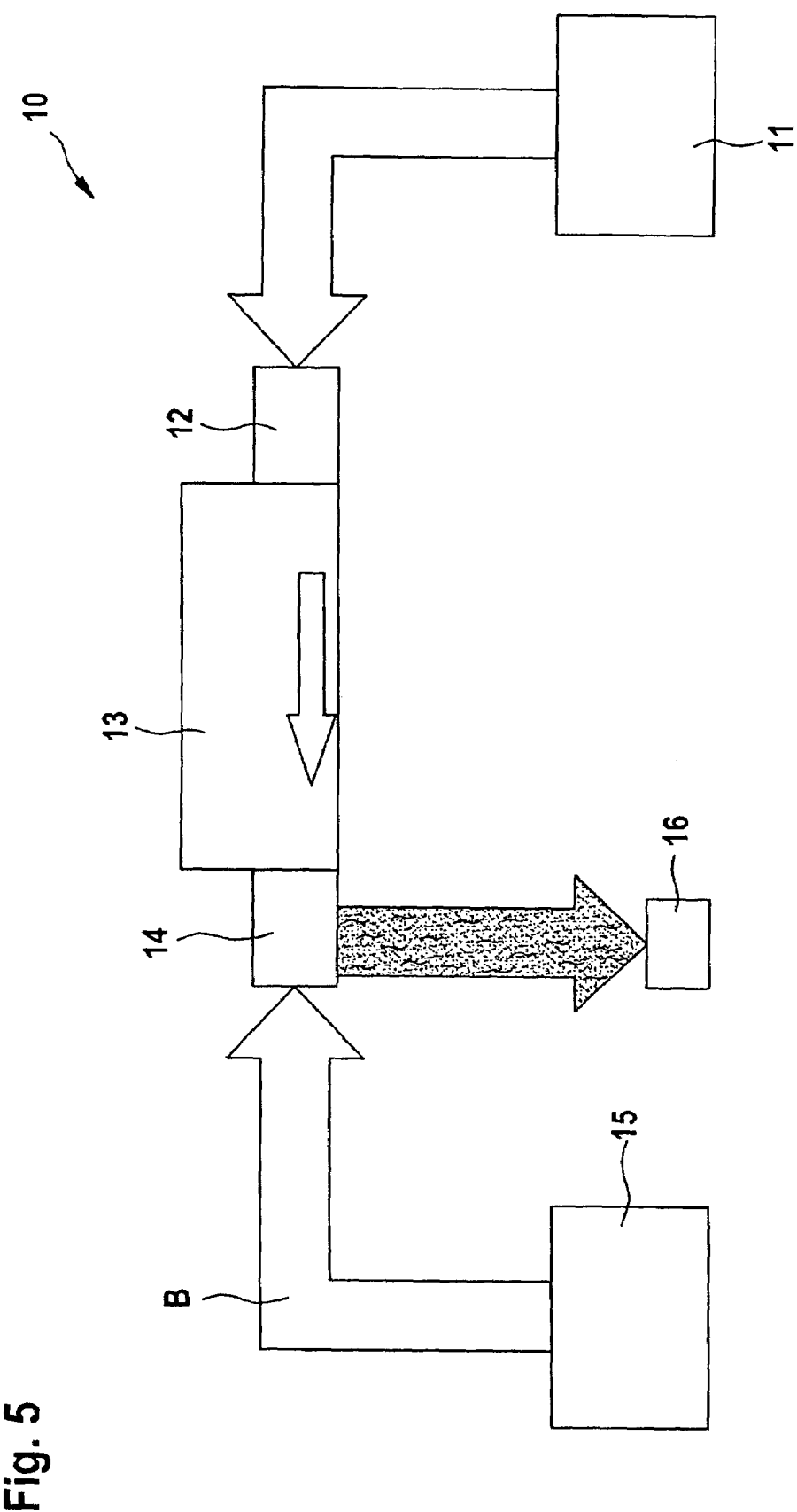
Figure 6:
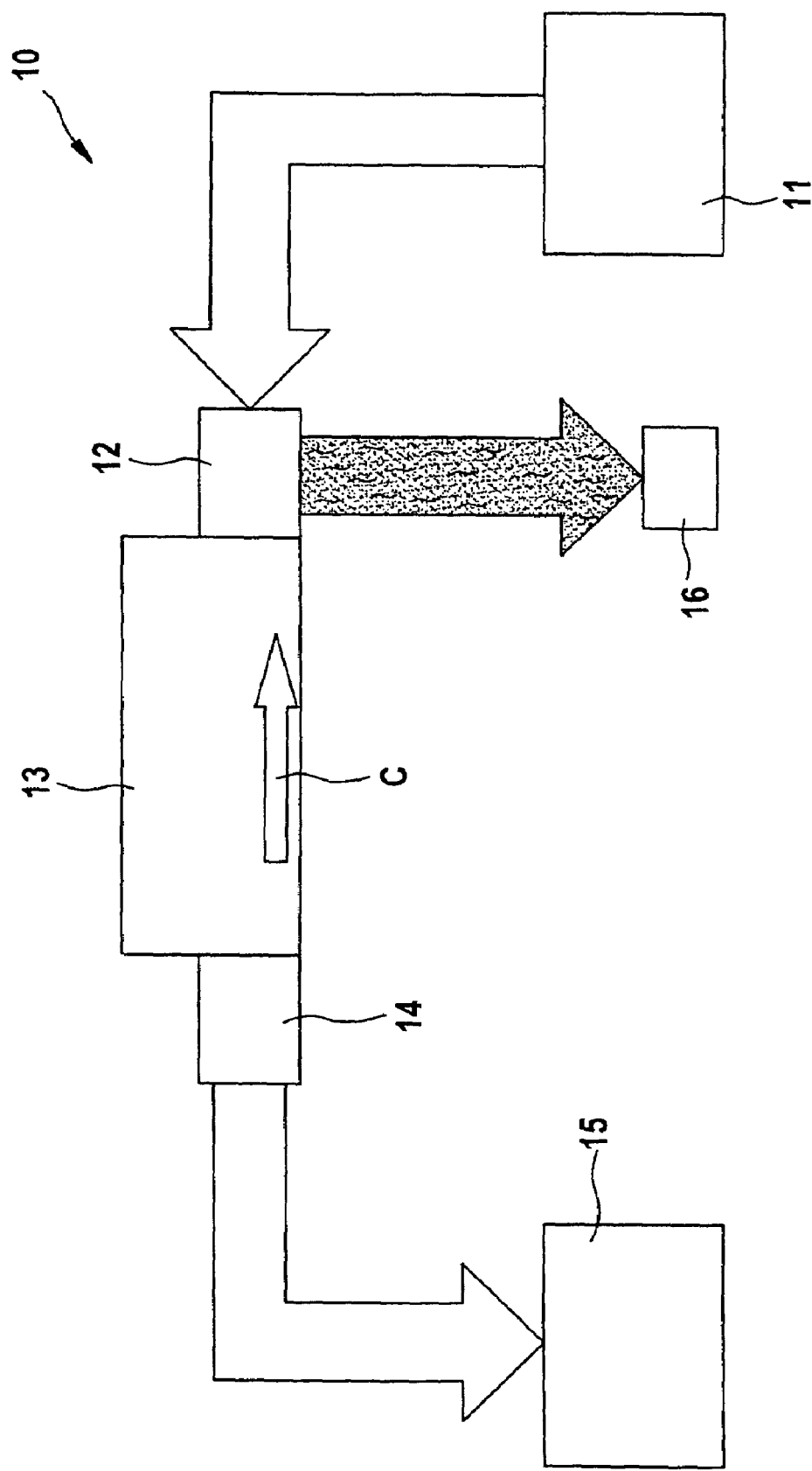

In FIGS. 4 to 6 is shown a production line 10 from the tobacco-processing industry, which is composed of several components. Purely as an example, the production line 10 includes in the main direction of conveying (according to arrow A) an apparatus 11 for manufacturing cigarettes or filter rods, which is called a maker, an inlet subassembly 12, a reservoir 13, an outlet subassembly 14 and an apparatus 15 for packing (hereinafter also called a packer) the articles (not shown) or for further processing or dispatch of the articles.

In FIG. 4 is shown the production line 10 in its usual working arrangement in which the articles forming the mass flow are conveyed continuously in one direction, namely in the direction of the main direction of conveying (according to arrow A). In this arrangement the articles are transported directly and completely from the maker to the packer. However, in order to empty the reservoir section within the reservoir 13 partially (in a part) or completely, further arrangements are provided according to FIGS. 5 and 6. In the arrangement according to FIG. 5, article ejection is provided in the region of the outlet subassembly 14. For this purpose the direction of transport between the apparatus 15 and the outlet subassembly 14 is reversed. In other words, in the region of the outlet subassembly the articles are transported in the direction opposite the main direction of conveying (according to arrow A) in the direction of arrow B. This ensures that articles which have already passed through the actual ejection position can be disposed of in an (external) collecting receptacle 16. In FIG. 6 an arrangement is also shown in which article ejection is provided in the region of the inlet subassembly 12. In this design/arrangement the direction of conveying within the reservoir 13 itself is reversed, that is, directed opposite the main direction of conveying (according to arrow A), as shown by arrow C.

Figure 1:
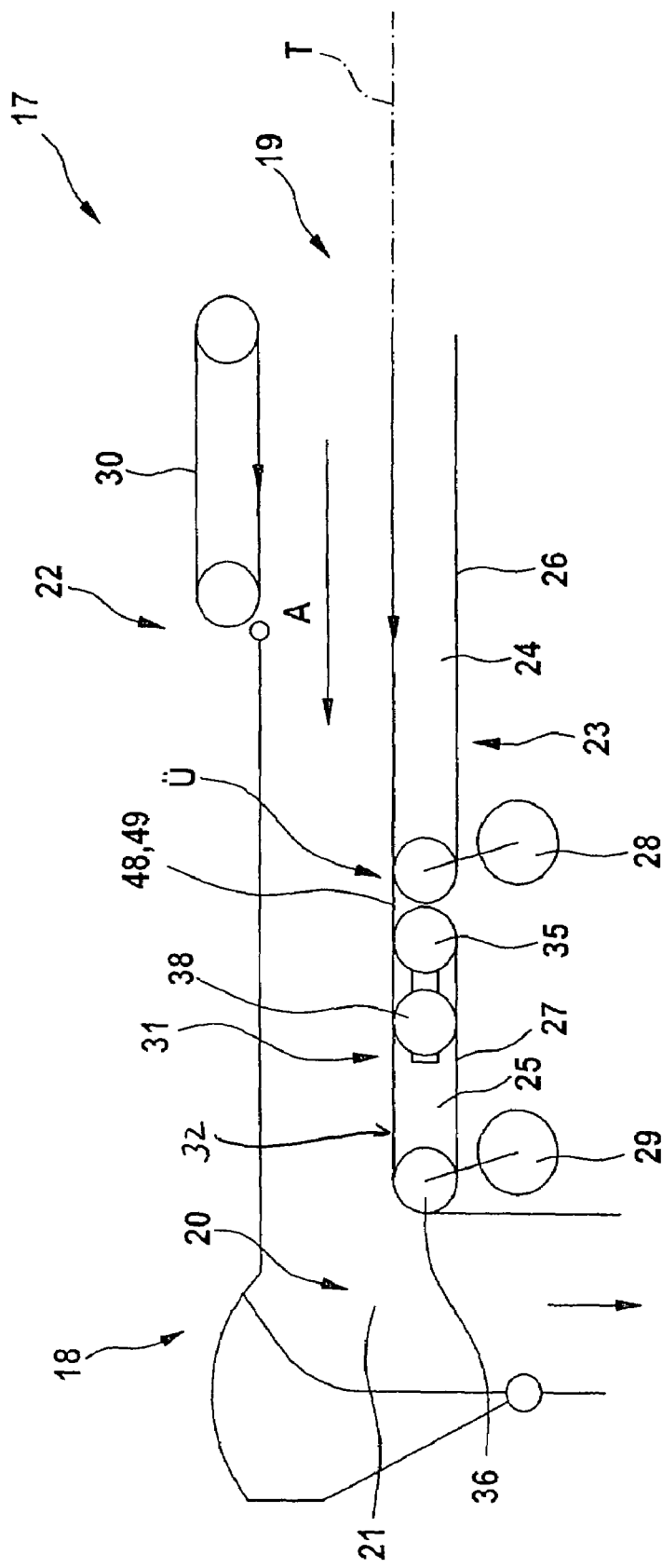
FIG. 1 a schematic side view of an apparatus for filling a subsequent apparatus, FIG. 2 a side view of parts of a lower conveying means as part of the apparatus according to FIG. 1 in the throughflow position, FIG. 3 the lower conveying means according to FIG. 2 in the discharge position, FIG. 4 a schematic view of a production line with an apparatus for transporting articles forming a mass flow in an ordinary working arrangement, FIG. 5 the production line with article ejection in the outlet region of the apparatus for transporting articles forming a mass flow, and FIG. 6 the production line with article ejection in the inlet region of the apparatus for transporting articles forming a mass flow.

In FIG. 1 is shown a detail of the above-mentioned reservoir 13 or, to be more precise, the outlet of the reservoir 13. The detail or outlet of the reservoir 13 shown is there connected as the preferred construction to an apparatus 17 for filling a subsequent apparatus (for example, a packer) with rod-shaped articles. The apparatus 17 includes a filling head 18 for filling the packer. The filling head 18 essentially includes a feed element 19 for transporting the mass flow composed of a plurality of articles in the main direction of conveying (according to arrow A). The feed element 19 comprises an orifice 20. The orifice 20 constitutes the transition from the feed element 19 into a chute 21. The chute 21 is a space/reservoir for holding a given number of articles and serves for the connection of a packer 15, for example.

The feed element 19 ends in the region of the orifice 20 leading into the chute 21 and in the embodiment shown is composed of an upper conveying means 22 and a lower conveying means 23. Between the two conveying means 22, 23 is formed a holding or storage space. The lower conveying means 23 includes at least two transport elements 24 and 25 arranged one behind the other, which in the throughflow position form a continuous and preferably horizontal plane of transport T. The gap in the region of transfer Ü of the articles or of the mass flow from the transport element 24 to the transport element 25 is bridged by means of transfer elements 48, 49. There is the possibility that a single transfer element is arranged on the frame. Preferably, however, a transfer element 48 is associated with the transport element 24, and a transfer element 49 is associated with the transport element 25. The upper conveying means 22 can also be designed as a stationary guide. Also, the position of the conveying means 22, which in FIG. 1 is arranged in the region of the inlet, can vary and in particular also be arranged near the filling head 18.

The rear transport element 25 in the main direction of conveying (according to arrow A) forms, together with the upper conveying means 22 or a corresponding guide, the orifice 20. Each transport element 24, 25 is designed as an endless belt or chain 26 or 27. The two belts/chains 26, 27 form a unitary, level supporting surface which defines the plane of transport T. One of the belts or chains 26, 27, but preferably both belts/chains 26, 27, can be driven by means of a drive 28 or 29, namely in both directions. The upper conveying means 22 includes at least one upper belt/chain 30 which is also endless and can be driven optionally in following or active mode (by drive means, not shown). In an embodiment not shown explicitly, the filling head 18 may further comprise an additional reservoir which is formed, for example, by deflectable belts/chains preferably of the upper conveying means 22.

The rear transport element 25 of the lower conveying means 23, in the direction of transport or the main direction of conveying (according to arrow A), is designed as an apparatus 31 for transporting articles forming a mass flow. The apparatus 31 includes an endless conveying element 32, for example, the belt/chain 27. The belt/chain 27 comprises a transport run 33 and a return run 34. The transport run 33 serves to receive and transport the articles and runs essentially in a horizontal direction in the plane of transport T. In the throughflow position, the transport run 33 is usually loaded with articles. The return run 34 runs outside the plane of transport T in order to return the belt/chain 27 to the starting point or transfer point of the articles to the belt/chain 27. The conveying element 32 is guided about at least two rollers 35, 36 designed as driving and/or deflecting elements.

The transport run 33 can be moved out of the throughflow position (see in particular FIG. 2), in which the transport run 33 has its maximum length (see $T_{max}$) and extends almost to the transport element 24, into a discharge position (see in particular FIG. 3), in which the transport run 33 is shortened from the maximum length $T_{max}$ down to a minimum length $T_{min}$, and vice versa. To put it another way, the length of the conveying section within the apparatus 31 can be varied within a range between $T_{min}$ and $T_{max}$ in such a way that an opening 37 can be formed for discharging the articles. The section of the transport run 33 which is moved out of the plane of transport T then forms part of the return run 34. This structural design is reversible. This means that the opening can be optionally opened for discharging articles or closed for transporting the articles.

A further third roller 38 is associated with the apparatus 31. At least one of the rollers 35, 36, 38 is movable relative to the other rollers 35, 36, 38 for varying the length of the transport run 33. The three deflecting and/or driving rollers 35, 36, 38 are arranged one behind the other in the main direction of conveying (according to arrow A) in the throughflow position (see e.g. FIG. 1) of the transport run 33. The centre axes of the rollers 35, 36, 38 in this embodiment are located in alignment in a plane, namely parallel to the plane of transport T. It has been seen to be particularly advantageous that the roller 35 arranged on the inlet side in the main direction of conveying (according to arrow A) is designed as a movable deflecting roller. Correspondingly, the roller 36 arranged on the outlet side in the main direction of conveying is designed as a driving roller, and the roller 38 arranged between the movable roller 35 and the driving roller 36 is designed as a stationary deflecting roller.

The movable roller 35 is preferably pivotable. For this purpose the roller 35 is arranged and mounted on a carrier 39. The roller 35 is attached rotatably but with fixed location to the carrier 39. The carrier 39 with the roller 35 is pivotable, this being about a pivot point S. The pivot point S of the carrier 39 lies outside the centre axis of the stationary roller 38 which is arranged and mounted on a frame of the apparatus 31. Preferably, the pivot point S lies behind the centre axis of the roller 38 in the main direction of conveying. In the embodiment shown, the pivot point S lies in the same plane in which the centre axes of the rollers 35, 36, 38 lie in the throughflow position of the transport run 33. The carrier 39 is pivotable by means of a cylinder 40 which is operated hydraulically, pneumatically or in some other usual manner. The cylinder 40 is attached to the frame of the apparatus 31 and operatively connected to the carrier 39 by means of a piston rod 41. To put it another way, one end of the piston rod 41 is connected to the cylinder 40 and the other end of the piston rod 41 is connected to the carrier 39. The connection between the piston rod 41 and the carrier 39 is such that a relative pivot movement between the piston rod 41 and the carrier 39 is ensured. Furthermore, the above-mentioned transfer element 49 is attached to the carrier 39, so that the transfer element 49 follows the pivot movement of the carrier 39.

In embodiments not described in more detail, several rollers may be movable, so that for example the transport run 33 can be shortened on the inlet and outlet sides. As a result, openings for discharge of the articles could be formed in the inlet region and outlet region. In the embodiment according to FIG. 1, the apparatus 31 is associated with the filling head 18 or forms an integral part of it. However, the apparatus 31 can be provided in different positions. The apparatus 31 can be designed as a component part or integral part of other components, for example, the reservoir 13. Also, an apparatus 31 may be provided in addition or alternatively in front of the reservoir 13, so that articles can still be discharged before actual storage in the reservoir 13.

Figure 2:
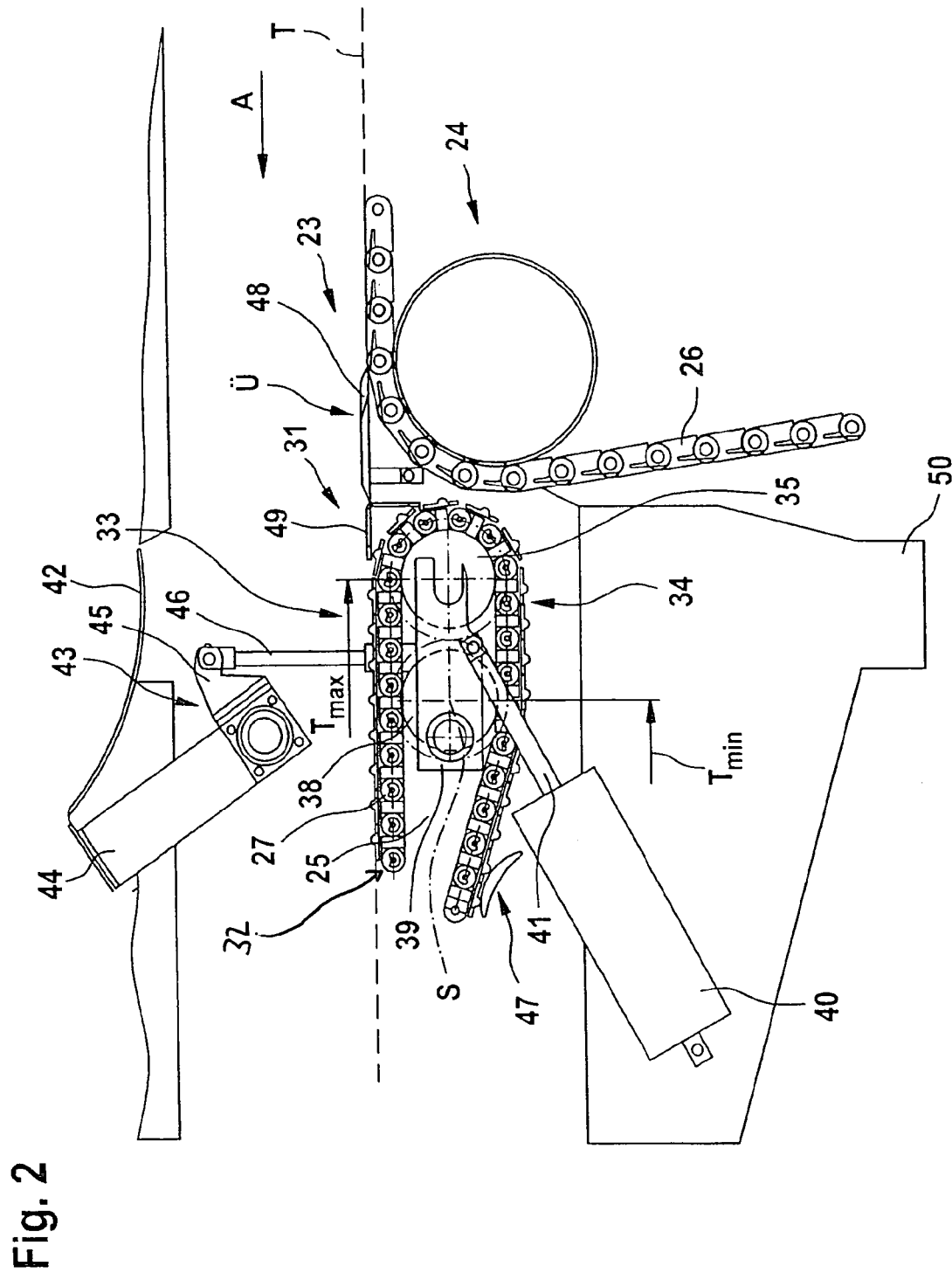
Figure 3:
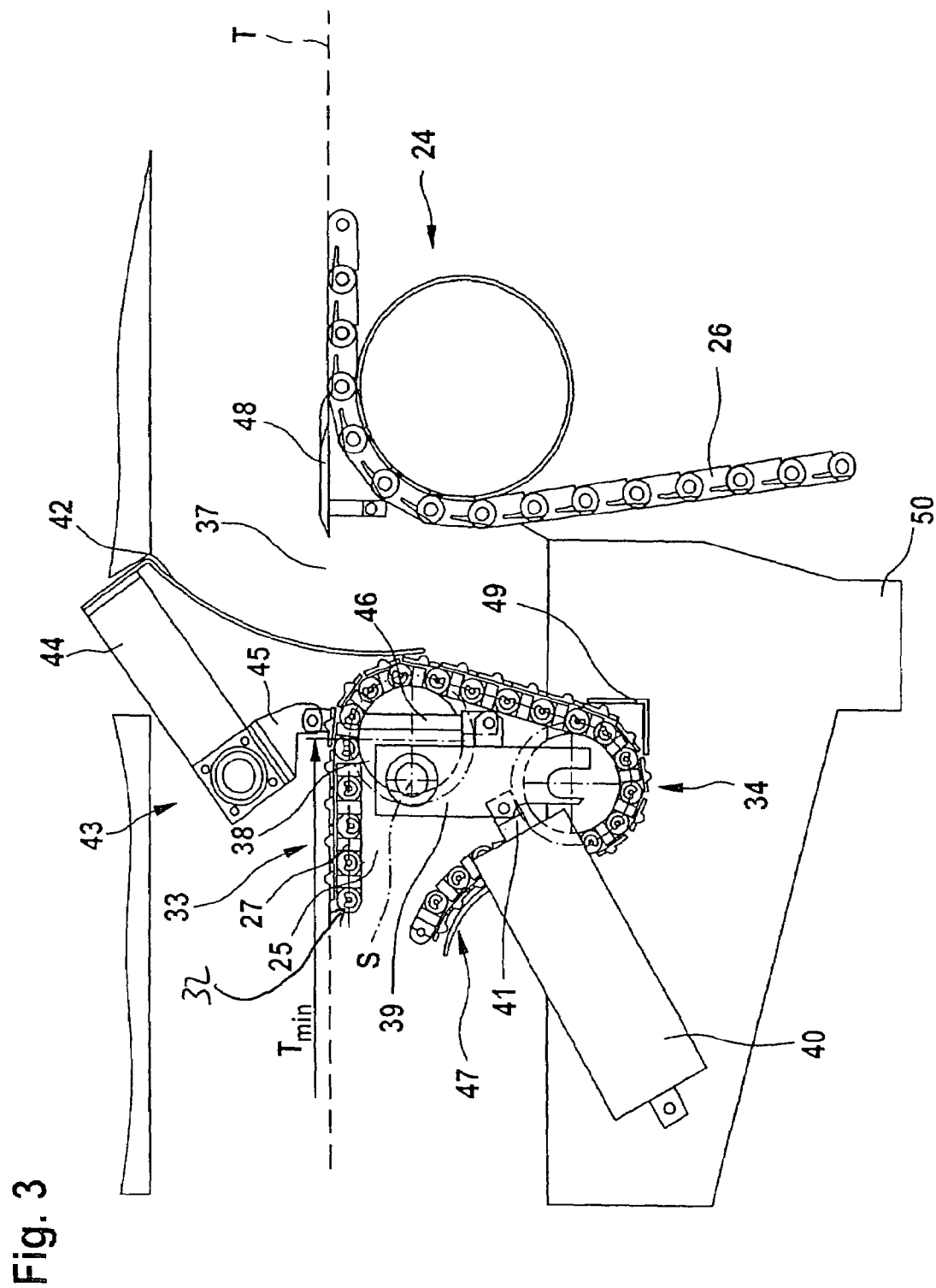

In the region of the transport run 33, preferably above the transport run 33, is arranged a separating or blocking element 42. The blocking element 42 in the embodiment shown is designed as a curved metal sheet. Other shapes and designs are of course possible too. Also the choice of material is variable. The blocking element 42 is movable out of an upper release position (as shown in FIG. 2), into a lower blocking position (as shown in FIG. 3), and vice versa. In the release position, the articles or the corresponding mass flow can be transported unhindered on the transport run 33 in the main direction of conveying. In the blocking position, the blocking element 42 is pivoted in such a way that it stands like a partition on the transport run 33, so that a transport stream in the main direction of conveying (according to arrow A) is interrupted. In other words, the blocking element 42 divides the mass flow into a region in front of the opening 37 to be formed (and described below) and a region behind the opening 37 to be formed. The blocking element 42 in the embodiment shown is arranged on the carrier 39 by means of a pivot device 43. As a result, a functional connection is made between the blocking element 42 and the carrier 39. Upon pivoting the carrier 39, the pivot device 43 in the uncoupled state and hence also the blocking element 42 is automatically pivoted. However, the connection between the carrier 39 on the one hand and the pivot device 43 on the other hand can be undone. By uncoupling, pivoting of the carrier 39 is possible, while the blocking element 42 remains in the upper rest or release position.

The pivot device 43 comprises a lever-like element 44. At one free end of the element 44 is arranged the blocking element 42. At the other free end is formed a flange 45. On the flange 45 is arranged a connecting rod 46 which connects the pivot device 43 to the carrier 39. The connecting rod 46 is positively guided in a guide (not shown), in such a way that the connecting rod 46 is movable linearly preferably in a direction perpendicular to the plane of transport T. For this purpose the connecting rod 46 is linked at both ends to the flange 45 on the one hand and to the carrier 39 on the other hand. Any other suitable means for pivoting the blocking element 42 out of the release position into the blocking position and back can be used as well.

Alternatively the blocking element 42 is for example arranged separately in the region of the frame of the apparatus 31 and provided with its own drive (not shown), for example, a pneumatic cylinder, for pivoting out of the release position into the blocking position and vice versa. Other possibilities of movement of the blocking element 42 in a linear and/or arcuate direction are possible too.

Furthermore, a tensioning element 47 is associated with the conveying element 32. The tensioning element 47, which can be e.g. a spring metal sheet or the like, is arranged in the region of the return run 34 and keeps the tension of the belt/chain 27 essentially constant regardless of the position of the rollers 35, 36, 38. However, the belt or chain tension can also be kept and controlled by any other normal means.

Below, the different principles of the method are described in more detail particularly with the aid of FIGS. 1 to 6.

Usual Production Method (See in Particular FIGS. 1 and 2)

During normal production, the blocking element 42 is in the upper rest position. The mass flow is moved in the main direction of conveying A. In the process, the mass flow is transferred from the transport element 24 by transfer elements 48, 49 or the like to the transport element 25, and fed from the latter through the orifice 20 to the chute 21. In this case, both conveying means 22 and 23 are driven or moved in the main direction of conveying A. With this method, the plane of transport T is, as it were, closed, so that all the articles which form the mass flow are transported from an input device to an output device, the articles optionally being capable of being at least partially stored during transport as well.

Selective Discharge of Detected Products

However, under certain circumstances there is a need or wish to be able to discharge certain articles or sections of the mass flow selectively, for example, in the case of substandard articles or for purposes of spot checks or the like. In such a case, the articles to be discharged are detected. As soon as the detected articles or the detected section has reached the transition region Ü between the transport elements 24, 25, the opening 37 forms by the fact that the carrier 39 with the roller 35 is pivoted. Due to pivoting, the transport run 33 is shortened from its maximum length which it exhibits in the throughflow position, so that the plane of transport T is interrupted. As the total length of the transport element 25 or, to be more precise, the belt/chain 27, is constant, the return run 34 is lengthened by exactly this length. At the same time as formation of the opening 37, the blocking element 42 is pivoted out of its release position into its blocking position. The blocking element 42 then stands in the blocking position directly in front of the roller 38. On the one hand this prevents articles which have already passed through the opening 37 from dropping through the opening 37 back into an ejection chute 50. On the other hand, the blocking element 42 prevents articles which have been detected as substandard, for example, from being transported further over the opening 37 or mixing with the undetected articles. In other words, the blocking element 42 forms an effective obstacle between the two transport elements 24, 25.

The articles located directly in front of the opening 37 on the transport element 24 in the main direction of conveying A are moved on in the main direction of conveying A, so that they drop through the opening into an ejection chute 50. Optionally, these discharged articles can then be collected in the collecting receptacle 16. During discharge of the detected articles, the transport element 25 stops. After discharge is over, the ejection chute 50 or the opening 37 is closed again. With pivoting of the carrier 39 and hence the roller 35 to close the opening 37, the blocking element 42 is also moved into the release position again. Alternatively, pivoting of the blocking element 42 can also take place independently of the carrier 39. The gap arising due to discharge between the articles already located on the transport element 25 and the articles following from the transport element 24 is closed, by the fact that the transport element 25 is still stationary while the transport element 24 is driven. As soon as the gap is closed, the transport element 25 is driven again.

Complete Emptying of the Whole System

In some cases, for example, with a change of product, it may however be necessary or desirable to completely empty the system, that is, in particular the apparatus 31. In such cases the opening 37 is formed in the manner described above. The articles or the mass flow entering the apparatus 31 is fed by the transport element 24 directly to the opening 37, the articles then dropping through the opening 37 into the ejection chute 50, for example, into the collecting receptacle 16 located underneath. Some of the articles or the leading part of the mass flow has already passed through the opening 37 at the time of formation of the opening 37 by pivoting of the carrier 39 and is located behind the opening 37 in the main direction of conveying (according to arrow A) on the transport run 33 of the transport element 25, which is then shortened. In order to discharge these articles or this section of the mass flow out of the apparatus 31 as well, the direction of driving the rear transport element 25 in the main direction of conveying is reversed, so that the belt/chain 27 is moved in the direction opposite the main direction of conveying. As a result, the articles are fed to the opening 37 and discharged through the latter into the ejection chute 50 and hence fed to the collecting receptacle 16. During discharge of all articles, the blocking element 42 remains in its release position. For this purpose it must under certain circumstances be uncoupled from the connection to the carrier 39, so that the pivot movement of the carrier 39 is not transmitted to the blocking element 42, or its own drive (not shown) must ensure that the blocking element remains in the upper position. At the end of discharge, that is, when the system is completely emptied, the opening 37 is closed again in the manner described above.

In all pivot movements of the carrier 39, due to the position of the pivot point S of the roller 35 on the one hand and the tensioning element 47 on the other hand it is ensured that the belt/chain 27 is permanently at the set tension.

The invention has been described in detail with respect to referred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

The invention claimed is:

1. Apparatus for transporting articles forming a mass flow from an input device to an output device, including an endless conveying element with a transport run and a return run, the conveying element being guided about at least three rollers designed as a driving and/or deflecting element, wherein the transport run can be moved out of a throughflow position in which the transport run exhibits its maximum length, into a discharge position in which the transport run is shortened from the maximum length, and vice versa, further wherein at least one of the deflecting and/or driving rollers is movable relative to the other deflecting and/or driving rollers for altering the length of the transport run.

2. Apparatus according to claim 1, characterized in that at least one section of the transport run can be converted to a return run and back.

3. Apparatus according to claim 1, characterized in that associated with the conveying element is a tensioning element which is arranged in the region of the return run.

4. Apparatus according to claim 1, characterized in that the three deflecting and or driving rollers are arranged one behind the other in the main direction of conveying (arrow A) of the mass flow in the throughflow position of the transport run, the centre axes of the deflecting and or driving rollers preferably lying in a horizontal plane.

5. Apparatus according to claim 1, characterized in that the roller arranged on the inlet side in the main direction of conveying of the mass flow is designed as a movable deflecting roller.

6. Apparatus according to claim 1, characterized in that the roller arranged on the outlet side in the main direction of conveying of the mass flow is designed as a driving roller, and the roller arranged between the movable roller and the driving roller is designed as a stationary deflecting roller.

7. Apparatus according to claim 5, characterized in that the movable roller is pivotable.

8. Apparatus according to claim 5, characterized in that the pivotable roller is arranged on a carrier.

9. Apparatus according to claim 8, characterized in that the carrier is pivotable, the pivot point S of the carrier being located outside the centre axis of the stationary deflecting roller, preferably behind the centre axis in the main direction of conveying of the mass flow.

10. Apparatus according to claim 9, characterized in that the pivot point S of the carrier lies in the same horizontal plane as the centre axes of the three driving and/or deflecting rollers in the throughflow position of the transport run.

11. Apparatus according to claim 8, characterized in that the carrier is pivotable by means of a cylinder, the cylinder being functionally connected to the carrier by a piston rod.

12. Apparatus according to claim 1, characterized in that in the region of the transport run is arranged a separating or blocking element which is movable out of a release position in which the mass flow can be transported unhindered on the transport run in the main direction of conveying, into a blocking position in which the mass flow is prevented from free transport in the main direction of conveying, and vice versa.

13. Apparatus according to claim 12, characterized in that the separating or blocking element is arranged on the carrier by means of a pivot device and functionally connected thereto.

14. Apparatus according to claim 12, characterized in that the separating or blocking element is movable by its own drive out of the release position into the blocking position and back.

15. Apparatus for filling a subsequent apparatus with rod-shaped articles, in particular a packer, including a filling head with a feed element for transporting articles forming a mass flow, the feed element leading into a chute in the region of an orifice and comprising a lower conveying means which includes two transport elements arranged one behind the other, characterized in that the rear transport element of the lower conveying means, in the main direction of conveying, is designed as an apparatus according to claim 1.

16. Apparatus according to claim 15, characterized in that the section between the two transport elements of the lower conveying means is closed by at least one transfer element.

17. Apparatus according to claim 15, characterized in that two transfer elements are provided, one transfer element being associated with the front transport element and the other transfer element with the rear transport element.

18. Method for transporting articles forming a mass flow, including the steps of:
   a. feeding the mass flow in the main direction of conveying into an apparatus for filling a subsequent apparatus, according to claim 15,
   b. transporting the mass flow from an inlet region to an outlet region, and
   c. carrying the mass flow away, characterized in that the mass flow is optionally carried away completely in the outlet region or discharged at least partially before reaching the outlet region.

19. Method according to claim 18, characterized in that the transport section for discharge of parts of the mass flow or the whole mass flow is opened between the inlet region and the outlet region.

20. Method according to claim 18, characterized in that discharge is effected automatically.

* * * * *